No. 679,888. Patented Aug. 6, 1901.
J. M. COLEMAN.
PLANTER.
(Application filed Jan. 18, 1901.)
(No Model.)
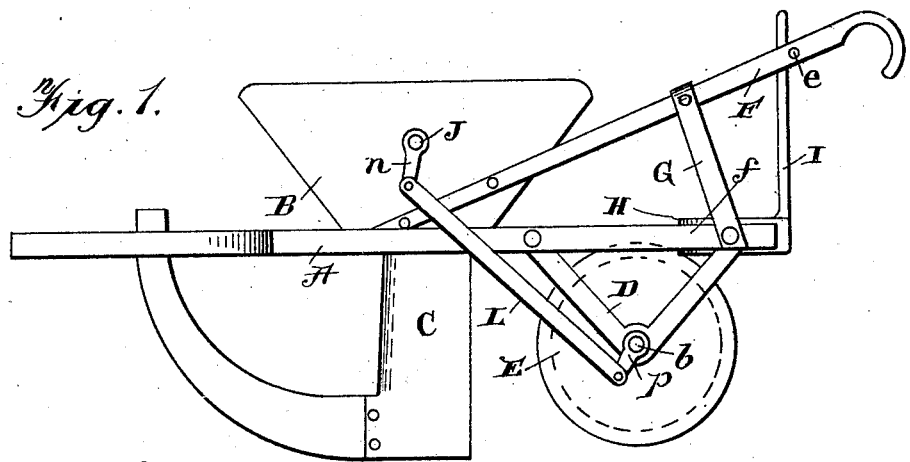
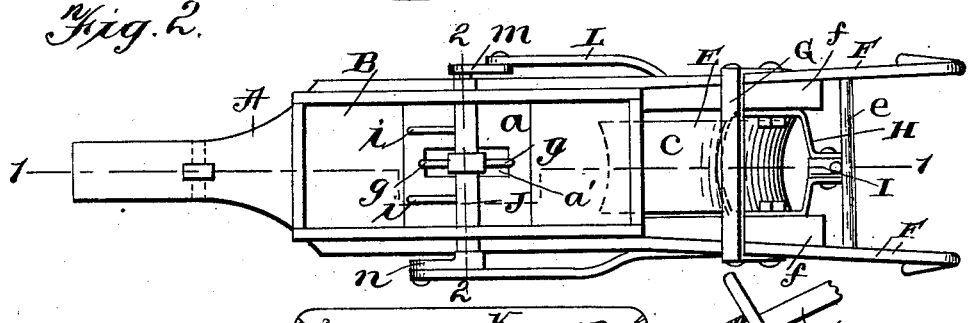
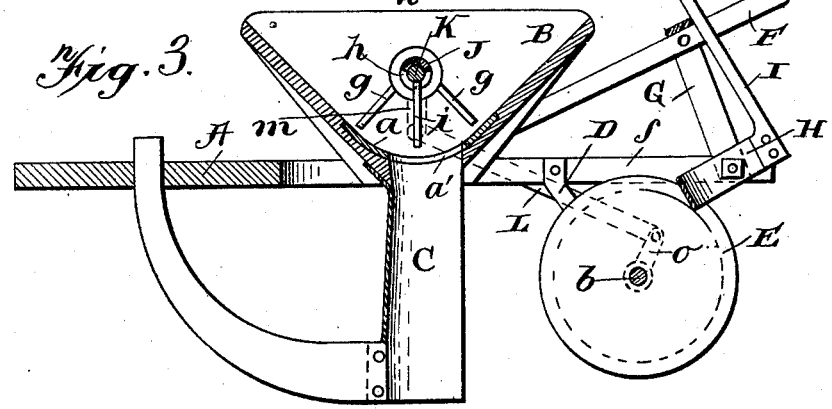
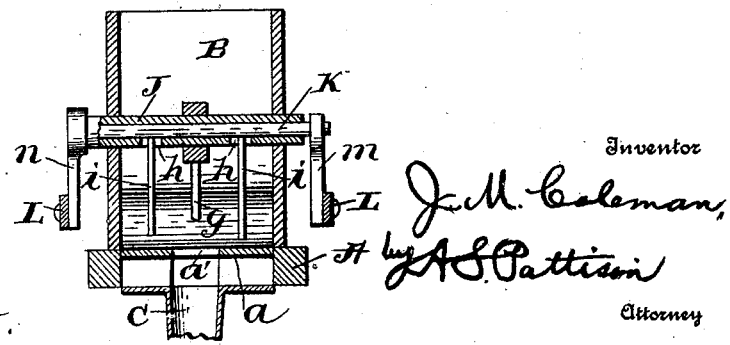
Witnesses
Geo. E. French
Chas. R. Wright
Inventor
J. M. Coleman
by J. S. Pattison
Attorney

UNITED STATES PATENT OFFICE.

JAMES MONROE COLEMAN, OF YAZOO CITY, MISSISSIPPI.

PLANTER.

SPECIFICATION forming part of Letters Patent No. 679,888, dated August 6, 1901.

Application filed January 18, 1901. Serial No. 43,750. (No model.)

*To all whom it may concern:*

Be it known that I, JAMES MONROE COLEMAN, a citizen of the United States, residing at Yazoo City, in the county of Yazoo and State of Mississippi, have invented new and useful Improvements in Planters, of which the following is a specification.

My invention relates to improvements in planters, and pertains more particularly to the class of cotton-planters in which there is an agitator in the hopper.

The object of my invention is to provide a planter in which the hopper is provided with an agitator in the bottom thereof which will absolutely prevent the seed from choking up the feed-opening, and thus producing a continuous flow of seed through the opening to the drill.

In the accompanying drawings, Figure 1 is a side view of my planter. Fig. 2 is a top plan view. Fig. 3 is a longitudinal sectional view taken on line 1 1 of Fig. 2. Fig. 4 is a transverse sectional view taken on line 2 2, Fig. 2.

Referring now to the drawings, A represents the ordinary frame of a seed-planter, having mounted thereon a hopper B, which is also of the ordinary type, having a curved bottom $a$, which is provided with an elongated longitudinally-extending opening $a'$, through which the seed is fed to the drill C, which is therebelow and secured to the frame A in any desired manner. The rear end of the frame A is provided with V-shaped downwardly-extending brackets D, which are provided with journals adapted to receive the ends of the shaft $b$ of the traction or draft wheel E, which has a concaved outer surface $c$. Said wheel is not only used for supporting the planter, but for driving the agitator, which will be more fully described hereinafter.

Secured to the forward end of the frame A on either side are handles F, which extend rearwardly on both sides of the hopper and have their rear ends connected by a cross-bar $e$. Braces G are secured to the extreme rear end of the frame and extend upwardly to the handles F and secured thereto. Pivotally connected between the rearwardly-extending bars $f$, forming part of the frame A, is a scraper H, having its lower end rounded to fit the concaved periphery $c$ of the supporting-wheel E for the purpose of scraping the mud therefrom. The upper end of the scraper has secured at right angles thereto an upwardly-extending operating-lever I, which is adapted to throw the scraper in or out of engagement with the wheel.

The hopper is provided with a transversely-arranged hollow shaft J, which extends through both sides of the hopper and is provided at its center within the hopper with downwardly-extending arms $g$, and on either side of said arms are elongated slots $h$, extending about half-way around the shaft. Situated within this hollow shaft J is a second shaft K, which is provided with downwardly-extending arms $i$, which extend through the openings or slots $h$ and are adapted to oscillate therein. The solid or inner shaft K at one side extends beyond the hollow shaft J and has secured thereto a crank $m$, and the hollow or outer shaft is provided on the opposite side outside of the hopper with a crank $n$, which is at an angle to the crank carried by the shaft J, whereby the teeth or agitators carried by the two shafts work independent of each and are adapted to oscillate in opposite directions during the movement of the planter.

The shaft $b$ of the wheel E carries at each end arms $o$ and $p$, and set on an angle to correspond to the angles of the crank $m$ and $n$, carried by the hollow and solid shafts, and connecting the respective cranks carried by the wheel-shaft and the agitator-shafts are pitmen L, which in turn operate the agitators.

It will be readily understood that when the drive-wheel is in motion the pitmen will impart a reciprocating motion to the cranks carried by the agitators, and said cranks being at an angle to each other when the teeth carried by the hollow shaft are traveling forward the teeth carried by the solid shaft are traveling rearwardly, and vice versa. By so constructing the teeth the seeds are more thoroughly agitated and prevent the choking of the feed-opening.

Having thus described my invention, what I claim, and desire to secure by Letters Patent, is—

1. In a planter, the combination with a hopper, of concentrically-arranged shafts, centrally-arranged teeth carried by one shaft and teeth carried by the second shaft on both sides of said teeth and working in opposite directions to the centrally-located teeth, substantially as described.

2. In a planter the combination with a hopper, of shafts arranged across said hopper one within the other, teeth carried by said shafts, and means carried on opposite ends of said shafts for oscillating the shafts in opposite directions, substantially as described.

3. In a planter, the combination with a hopper, of a hollow shaft having slots extending partially therearound, teeth carried by said shaft, a shaft within said shaft teeth carried by said shaft and projecting through the hollow shaft, and means for oscillating said shafts in opposite directions, substantially as described.

4. In a planter, the combination with a hopper, of a hollow shaft carrying centrally-located downwardly-projecting teeth and having an elongated slot on either side extending partially therearound, a solid shaft within the hollow shaft, teeth carried by said shaft and projecting through the elongated opening and means for oscillating said shafts in opposite directions, substantially as described.

5. A planter, comprising a frame, a hopper mounted thereon, a drive-wheel mounted therein and carrying driving-cranks on either side, a hollow shaft extending transversely through the hopper and having slots extending partially therearound, teeth carried by said shaft between said slots, a solid shaft within the hollow shaft and having teeth projecting through the slots, a crank on one side connected to the hollow shaft, a second crank on the opposite side connected to the solid shaft, and pitmen connecting said cranks with the drive-cranks, substantially as described.

6. In a planter the combination with a hopper of shafts arranged across said hopper, one entirely within the other, teeth carried by said shafts and cranks on opposite ends of the shafts for oscillating them in opposite directions, substantially as described.

In testimony whereof I have hereunto set my hand in the presence of two subscribing witnesses.

JAMES MONROE COLEMAN.

Witnesses:
 H. M. LOVE,
 T. F. DAVIS.